350-6.3 SR
XR 2,543,463
TX 3022 T

ADDED Feb. 27, 1951 W. A. R. MALM 2,543,463

KINETO-OPTICAL SCANNER FOR TELEVISION

Original Filed April 15, 1944

William A. R. Malm INVENTOR.

2543463
NO OR CLASSIF

Patented Feb. 27, 1951 2,543,463

UNITED STATES PATENT OFFICE 2,543,463

KINETO-OPTICAL SCANNER FOR TELEVISION

William A. R. Malm, New Orleans, La.

Original application April 15, 1944, Serial No. 531,205. Divided and this application October 27, 1945, Serial No. 625,034

1 Claim. (Cl. 178—7.1)

This invention relates to methods and means for producing and controlling scanning light beams in the transmitter of a television system and the like.

Object scanning at the transmitter and image scanning at the receiver have both been accomplished by electronic and mechanical means. The electronic devices were efficient but expensive, while the mechanical devices proposed heretofore were inexpensive but inefficient and some were impractical.

An object of this invention is to provide practical means for scanning an object for efficient transmission of a television image.

Other objects of this invention will appear hereinafter.

The views in the drawing are entirely sectional, to facilitate illustration of the optical devices.

Figure 1:
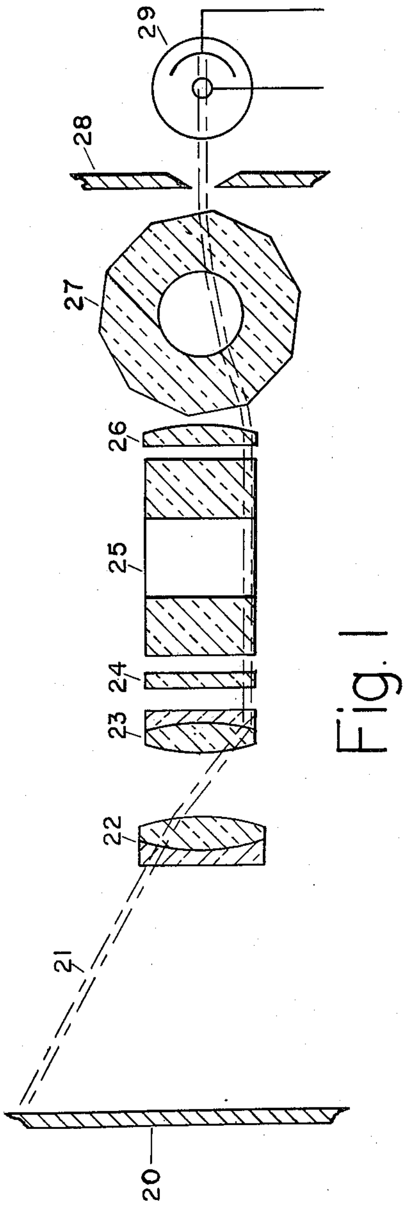
Figure 1 is a vertical plane section of a television camera, embodying the related devices for scanning a television object for the transmission of television images. The parallel scanning light beam is shown as proportionately oversized, as it is quite obvious that high quality picture detail can be obtained only when said parallel beam of light has an extremely small cross-sectional area.
Figure 2:
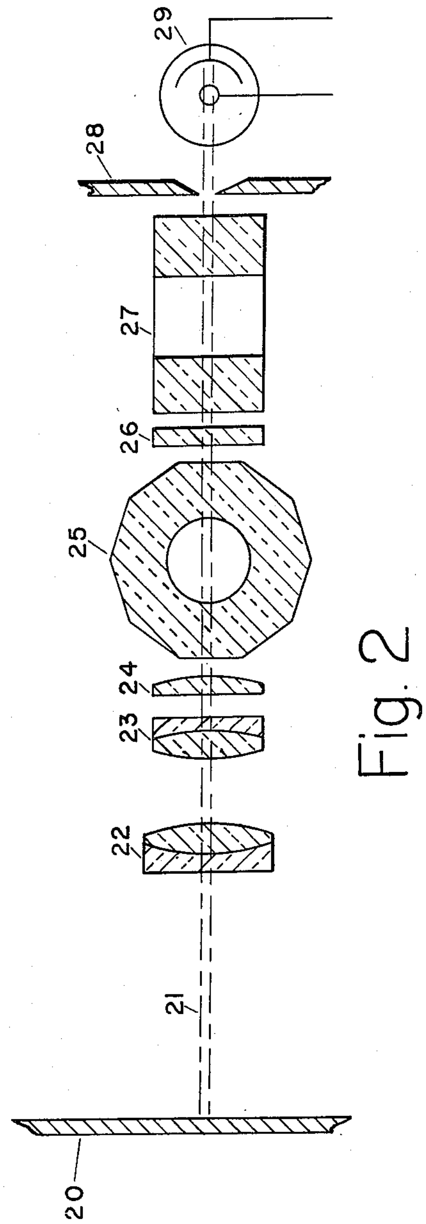
Figure 2 is a horizontal plane section of said television camera.

Description of the devices shown in the drawing will disclose their operation.

20 represents an object being scanned by a parallel light beam 21. The effective focus of the lens assembly 22 and 23 determines the size of the field of view being scanned.

Cylindrical lens 24 converges, in a horizontal plane, all of the rays intercepted by lens assembly 22 and 23.

Prismatic lens 25 is a polyhedron with a concentric circular hole, which rotates in a horizontal plane and at a constant speed. Its speed must be consistent with the number of polygonal sides of the polyhedron, image scanning line and frame frequencies, and the practical limits of rotational devices.

Cylindrical lens 26 converges, in a vertical plane, all of the rays horizontally deflected by rotating prismatic lens 25.

Prismatic lens 27 is a polyhedron with a concentric circular hole, which rotates in a vertical plane and at a constant speed. Its speed must be consistent with the number of polygonal sides of the polyhedron, image scanning line and frame frequencies, and the practical limits of rotational devices.

The speed of rotation of prismatic lenses 25 and 27 increases with the required number of image scanning lines and frames per second, and varies inversely as the number of polygonal sides.

The means for rotating and synchronizing prismatic lenses 25 and 27 are not shown in the drawing, for simplicity, as they are conventional devices.

The concentric circular hole in prismatic lenses 25 and 27 provides means for increasing the total deflection of the beams refracted by said prismatic lenses, to compensate for reduced refraction in the polyhedron caused by increasing the number of polygonal sides in order to obtain a rotational speed within practical limits and commensurate with present day standards of line and frame frequencies. Experiments have demonstrated that the angle of total deflection of the scanning beam within the polyhedron varies inversely as the diameter of the concentric circular hole.

The aperture in plate 28, by virtue of the related positions of prismatic lenses 25 and 27, allows only the rays from the spot of the object which is being scanned at each instant to enter the photo-electric cell symbolized by 29.

Photo-electric cell 29 converts the light ray impulses passing through aperture in plate 28 into electrical impulses which may be conducted or radiated by means of conventional wire or radio devices to one or more television receivers synchronized with the described devices.

A suitable filter, placed between the object 20 and lens assembly 22 and 23, would make the devices shown in the drawing sensitive to infra-red or ultra-violet rays as may be required. However, the refractive devices would transmit infra-red or ultra-violet rays more efficiently if they were made of polystyrene or similar plastic material.

The infra-red or ultra-violet sensitivity of photo-electric cell 29 would be increased, if at least a portion of the bulb through which the rays pass was made of polystyrene or similar plastic material.

This invention may have other embodiments without departing from its spirit.

This application is a division of my pending application, Serial No. 531,205, filed April 15, 1944.

What is claimed as new and desired to be secured by Letters Patent, is as follows;

In a television image transmitter and the like, means for horizontally and vertically scanning an object; comprising an achromatic lens assembly for intercepting a parallel beam of light radiated from successive areas on the surface of said object, a horizontally rotating polyhedronal prismatic lens having a concentric circular hole and functioning with a related vertical axis cylindrical lens to horizontally deflect said parallel light beam, a vertically rotating polyhedronal prismatic lens having a concentric circular hole and functioning with a related horizontal axis cylindrical lens to vertically deflect said parallel light beam, an aperture plate which by virtue of the successive related positions of said horizontally and vertically rotating prismatic lenses allows only the light within said light beam radiated from each successive object surface area being scanned to convey modulating impulses to a photo-electric cell.

WILLIAM A. R. MALM.

REFERENCES CITED

The following references are of record in the file of this patent:

UNITED STATES PATENTS

| Number | Name | Date |
|---|---|---|
| 2,085,594 | Leventhal | June 29, 1937 |
| 2,139,869 | Traub | Dec. 13, 1938 |
| 2,157,468 | Walton | May 9, 1939 |
| 2,158,990 | Van Okolicsanyi | May 16, 1939 |
| 2,213,307 | Elliott | Sept. 3, 1940 |
| 2,222,937 | Dimmick | Nov. 26, 1940 |